United States Patent
Castillo García et al.

(10) Patent No.: US 11,724,655 B2
(45) Date of Patent: Aug. 15, 2023

(54) INTERIOR TRIM FOR VEHICLES WITH ELECTRICAL CONDUCTORS AND METHOD FOR MANUFACTURING SAME

(71) Applicant: GRUPO ANTOLÍN-INGENIERÍA, S. A., Burgos (ES)

(72) Inventors: Marta María Castillo García, Burgos (ES); Jesús Vicente Escudero Delgado, Burgos (ES)

(73) Assignee: GRUPO ANTOLÍN-INGENIERÍA, S. A., Burgos (ES)

( * ) Notice: Subject to any disclaimer, the term of this patent is extended or adjusted under 35 U.S.C. 154(b) by 754 days.

(21) Appl. No.: 16/619,989

(22) PCT Filed: May 31, 2018

(86) PCT No.: PCT/EP2018/064327
§ 371 (c)(1),
(2) Date: Dec. 6, 2019

(87) PCT Pub. No.: WO2018/224383
PCT Pub. Date: Dec. 13, 2018

(65) Prior Publication Data
US 2021/0188192 A1    Jun. 24, 2021

(30) Foreign Application Priority Data

Jun. 7, 2017  (EP) .................................... 17382343

(51) Int. Cl.
*B60R 13/02* (2006.01)
*B60R 16/02* (2006.01)
(Continued)

(52) U.S. Cl.
CPC .............. *B60R 13/02* (2013.01); *B32B 27/12* (2013.01); *B32B 38/0004* (2013.01);
(Continued)

(58) Field of Classification Search
CPC ..... B60R 13/02; B60R 16/02; B60R 16/0215; B32B 27/12; B32B 38/0004;
(Continued)

(56) References Cited

U.S. PATENT DOCUMENTS 5,205,635 A  *  4/1993  Van Order .......... B60R 13/0212
                                                    362/135
8,377,347 B2 *  2/2013  Sostmann ........... B60R 13/0256
                                                    264/254
(Continued)

FOREIGN PATENT DOCUMENTS

DE          10019410 A1    10/2001
DE          10109086 A1     9/2002
(Continued)

OTHER PUBLICATIONS

Jul. 3, 2018—(WO) International Search Report—International Appln. No. PCT/EP2018/064327.

*Primary Examiner* — Pinel E Romain
(74) *Attorney, Agent, or Firm* — Banner & Witcoff, Ltd.

(57) ABSTRACT

Interior trim for vehicles, specifically of the type comprising a sandwich structure, where the electrical conductors are integrated by printing with conductive inks, specifically by screen printing, allowing to make compatible the manufacturing method for the interior trim and the printing method for the electrical conductors, while also facilitating the electrical connections through the edges of the trim of the electrical conductors and the electric devices assembled in the interior trim and ensuring the correct operation of the electrical conductors throughout the useful lifetime of the interior trim. The invention also relates to a method for manufacturing an interior trim for vehicles with electrical conductors.

21 Claims, 3 Drawing Sheets

(51) Int. Cl.
*B32B 27/12* (2006.01)
*B32B 38/00* (2006.01)
*B41M 1/12* (2006.01)
*B41M 3/00* (2006.01)
*B62D 65/14* (2006.01)
*B32B 7/025* (2019.01)

(52) U.S. Cl.
CPC ........ *B32B 38/0036* (2013.01); *B32B 38/145* (2013.01); *B41M 1/12* (2013.01); *B41M 3/006* (2013.01); *B60R 16/02* (2013.01); *B62D 65/14* (2013.01); *B32B 7/025* (2019.01); *B32B 2307/202* (2013.01); *B32B 2605/003* (2013.01); *B41P 2200/40* (2013.01)

(58) Field of Classification Search
CPC ... B32B 38/0036; B32B 38/145; B32B 7/025; B32B 2307/202; B32B 2605/003; B41M 1/12; B41M 3/006; B62D 65/14; B41P 2200/40
USPC ........................................................ 296/1.08
See application file for complete search history.

(56) References Cited

U.S. PATENT DOCUMENTS

| | | | |
|---|---|---|---|
| 9,333,687 B2* | 5/2016 | Xiong | G02B 1/10 |
| 9,981,699 B2* | 5/2018 | Ayuzawa | B32B 3/26 |
| 11,104,229 B2* | 8/2021 | Galan Garcia | B60Q 3/745 |
| 2012/0001457 A1* | 1/2012 | VanHouten | H05K 3/12 |
| | | | 361/752 |
| 2018/0118101 A1* | 5/2018 | Salter | B60Q 3/20 |
| 2019/0135199 A1* | 5/2019 | Galan Garcia | B60K 35/00 |
| 2022/0215982 A1* | 7/2022 | Takamatsu | H01B 7/0009 |

FOREIGN PATENT DOCUMENTS

| | | | |
|---|---|---|---|
| DE | 102004063061 A1 | 7/2006 | |
| DE | 102014005001 A1 | 10/2015 | |
| KR | 20150063178 A * | 6/2015 | |
| KR | 101553595 B1 * | 9/2015 | |
| WO | WO-2016063907 A1 * | 4/2016 | ........... H05K 1/0353 |

* cited by examiner

INTERIOR TRIM FOR VEHICLES WITH ELECTRICAL CONDUCTORS AND METHOD FOR MANUFACTURING SAME

The present application is a U.S. National Phase Application under 35 U.S.C. § 371 of PCT/EP2018/064327 filed May 31, 2018, which claims priority to European application (EP) 17382343.6, filed Jun. 7, 2017, the contents therein of the applications is incorporated by reference herein in its entirety.

TECHNICAL FIELD OF THE INVENTION

The present invention relates to an interior trim for vehicles, particularly of the type comprising a sandwich structure, where the electrical conductors are integrated by conductive ink printing, particularly by screen printing. The invention also relates to a method for manufacturing an interior trim for vehicles with electrical conductors, and particularly to the method for manufacturing the electrical conductive sheet of the interior trim that comprises said electrical conductors.

BACKGROUND OF THE INVENTION

Patent EP2385910 describes an interior trim formed by a sandwich structure where the electrical conductors are integrated on said sandwich structure by various techniques for printing conductive inks, such as screen printing.

One of the main drawbacks associated with sandwich structures as those described in EP2385910 consists in making compatible the method for manufacturing the interior trim and the method for printing the electrical conductors.

Patent EP2385910 describes in general terms various configurations associated with various methods for manufacturing the interior trim considering printing of the electrical conductors in any of the layers forming said sandwich structure and in any of the sides of said layers.

In addition, patent EP2385910 discusses the possibility that the electrical conductors be coated with an insulating material layer that acts as a protective layer thereof, in order to ensure their proper operation.

The choice of the interior trim layer on which the printing of the electrical conductors is performed conditions the form of execution of the electrical connections that allow connecting the electrical conductors printed on the interior trim and the various electric devices assembled in said trim.

Said electric devices can include the general power supply for the vehicle or the electric components mounted on the interior trim to increase the comfort thereof, such as a lighting console, an electric sunvisor, or buttons to operate devices such as a sunroof or a lighting console.

The arrangement of the electrical connections presents a concrete difficulty in the areas of the interior trim with edges that are cut during the manufacturing method of the interior trim in order to obtain the final shape of said interior trim, and through which the various electric devices assembled in the interior trim are connected to the electrical conductors printed therein.

To address this issue, patent EP2385910 describes the use of additional strips of conductive material placed between the layers forming the interior trim that are in contact on one side with the electrical conductors and on the other they protrude from the edge of the interior trim for connection to an electric device.

The arrangement described in EP2385910 requires the use of specific cutting techniques and tools that allow controlling the depth of the cut to prevent damaging the conductive strips that protrude from the edge of the interior trim.

Said cutting techniques considerably increase the manufacturing time for the interior trim and increase the cost of manufacturing same due to the longer cycle time and the use of cutting devices specifically designed for cuts with a controlled depth.

On another hand, said protruding conductive strips may be damaged during transport and/or assembly of the interior trim unless suitably protected.

Moreover, other factors considered essential for ensuring that the printed electrical conductors operate correctly throughout their lifetime are the continuity of the circuit conductivity throughout the path thereof, and the fastening of the electrical conductors to the layer of the interior trim on which they are printed.

In view of the above, the subject matter of the invention relates to an interior trim for vehicles with electrical conductors, where the interior trim is formed by a sandwich structure that allows making compatible the manufacturing method for the interior trim and the printing method for the electrical conductors, while also facilitating the electrical connections at the edges of the trim of the electrical conductors and the electric devices assembled in the interior trim and finally ensure in a reliable manner the correct operation of the electrical conductors throughout the useful lifetime of the interior trim.

DESCRIPTION OF THE INVENTION

The present invention is established and characterised in the independent claims, while the dependent claims describe additional characteristics thereof.

Firstly, the arrangement of the invention allows making compatible the manufacturing method for the interior trim with the printing process for the electrical conductors, while at the same time facilitating the arrangement of the electrical connections of the electrical conductors with the electric devices, particularly at the edges of the interior trim at which the connections are established.

On the one hand this is possible due to the position of the electrical conductors printed on one of the outer sides of the interior trim, this outer side being accessible in order to carry out the connection of the electric devices with the electrical conductors.

On the other hand, due to the above, that is, the accessibility of the electrical conductors, it is possible to arrange connection areas that do not protrude from the edge of the interior trim through which an electrical device is connected.

In this way, the accessibility of the location of the connection area allows the electrical device to be brought near the connection areas, instead of vice versa.

As a result of this, it is possible to cut all the layers forming the structure of the trim during the trim manufacturing method in order to form, for example, the openings housing the electric components.

Cuts of this type can be performed using conventional cutting methods and devices in which the manufacturing cycle for the interior trim is not increased in time or in cost.

In addition, the accessibility of the electrical conductors, and particularly the connection areas, is provided by the specific form in which the protective layer is applied on the electrical conductors establishing an area free of insulation on the conductive layer to allow electrical connection.

An optional feature of the invention involves the application of the protective layer by screen printing. Said method allows a controlled, simple and quick configuration of the application of the protective layer on the electrical conductors. It also allows using the means employed to apply the conductive layer configuring the electrical conductors to apply the electrical protection layer.

An optional feature of the invention involves subjecting the electrical conductive layer to a thermal treatment after it is deposited on the flexible carrier. This thermal treatment causes the cohesion of the metal material of the particles forming part of the conductive ink, resulting in a continuous conductive layer. This allows ensuring the electrical conductivity of the electrical conductors throughout their path.

An optional feature of the invention is the selection of a fibrous flexible carrier to configure the electrical conductive sheet. This allows the electrical conductive layer to penetrate through the fibres that form the flexible carrier, being embedded in it. This allows ensuring the attachment of the conductive layer on said flexible carrier, thereby guaranteeing the proper operation of the electrical conductors throughout the lifetime of the interior trim.

DESCRIPTION OF THE FIGURES

This specification is supplemented with a set of drawings illustrating the preferred embodiment, which are never intended to limit the invention.

DETAILED DESCRIPTION OF THE INVENTION

Figure 1:
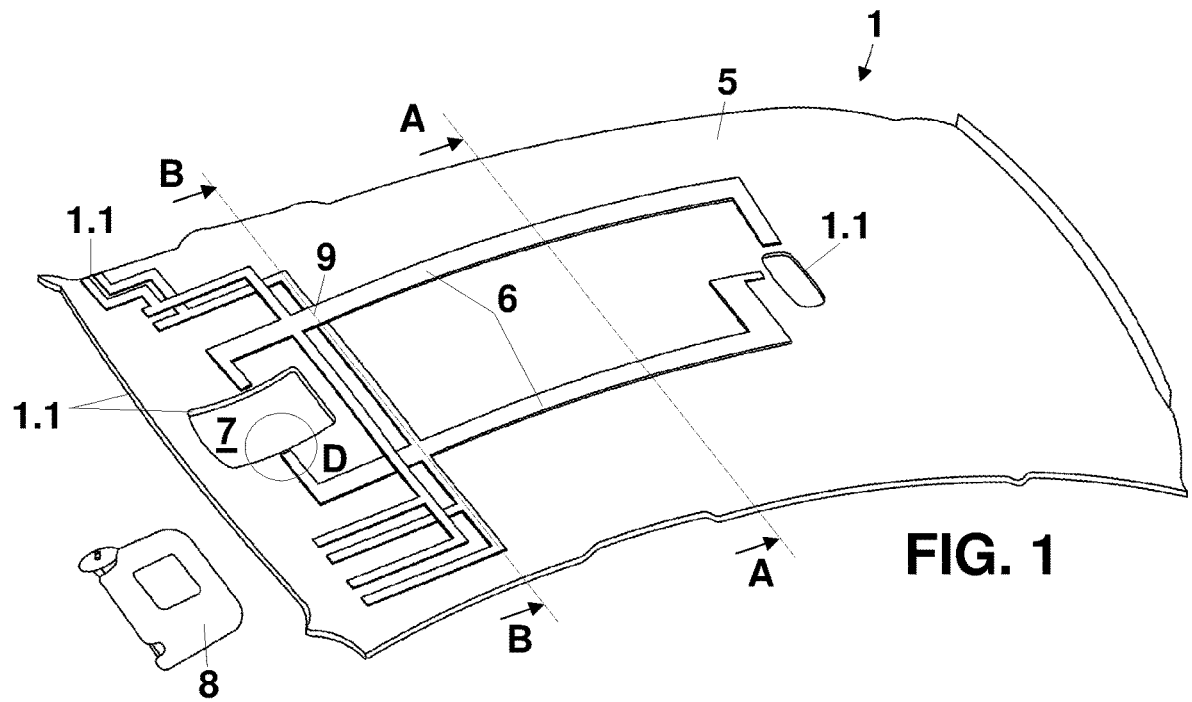
FIG. 1 shows a perspective view of an interior trim for vehicles with the electrical conductors.
Figure 2:
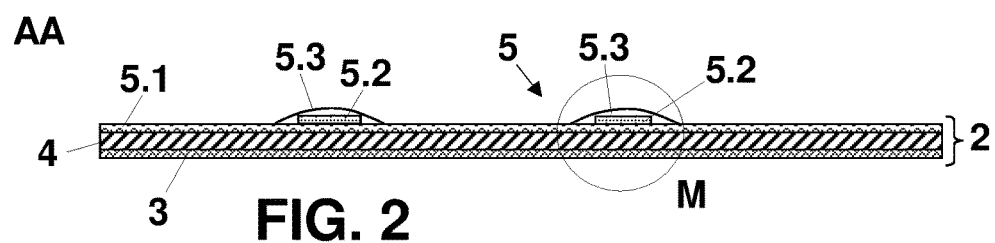
FIG. 2 shows a cross-section view along the AA line represented in FIG. 1, corresponding to a cross section of the interior trim showing the various layers that form the interior trim, including the layers that form the electrical conductive sheet.
Figure 3:
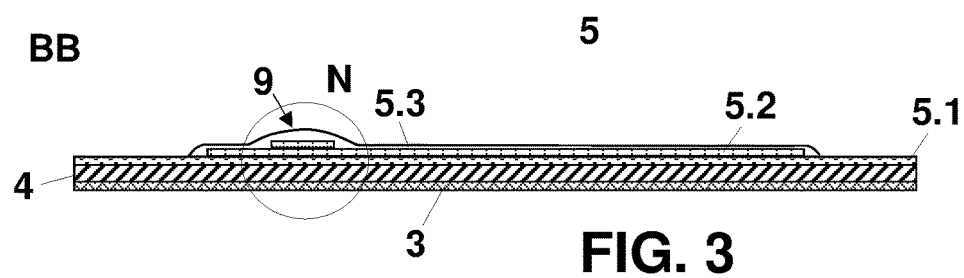
FIG. 3 shows a cross-section view along the BB line represented in FIG. 1, corresponding to a cross section of the interior trim showing the various layers that form the interior trim in an area of superposition of electrical conductive layers.

FIG. 1 shows an interior trim (1) for vehicles with the electrical conductors (6). Specifically, the example represented in FIG. 1 is a roof trim. However, the invention considers other types of interior trims (1), such as coverings for the vehicle floor or trays separating the interior compartment from the luggage area.

Said interior trim (1) presents edges (1.1) defined during the manufacturing method based on a sandwich structure (2) that is shaped according to the shape of the interior trim (1) and cut according to the dimensions and final configuration of the interior trim (1).

Depending on the type of shaping method, the configuration of the interior trim (1) and the layers forming the sandwich structure (2), the shaping and cutting operations may be performed before and/or after each other or even simultaneously.

The edges (1.1) extend along the outer perimeter of the interior trim (1) and/or along the perimeter of the openings (7) located in said interior trim (1).

In addition, when the interior trim (1) is in an assembly position in the vehicle interior, said edges (1.1) are near an electrical device (8).

Said proximity allows the connection of the electrical device (8) to the electrical conductor (6) integrated in the interior trim (1) through said edges (1.1). Therefore, the electrical device (8) can be connected to the electrical conductor (6) through said edges (1.1).

The electrical device (8) can be, for example, an electrified sunscreen, a lighting console, a reading spot, a switch or even the general power supply of the vehicle.

The path of the electrical conductors (6) follows a predefined and specific route that depends on the power supply needs of each interior trim (1). Said needs are in turn constrained by the number and position of the electrical devices (8) that can be connected to the interior trim (1).

In addition, the sandwich structure (2) of the interior trim (1) comprises the following superimposed layers:

a decorating covering (3) forming the outer side of the interior trim (1), a core (4) comprising a first side (4.1), on which the decorative covering (3) is placed, and a second side (4.2), and an electrical conductive sheet (5) placed on the second side (4.2) of the core (4) forming the inner side of the interior trim (1).

According to an assembly position of the interior trim (1) in the vehicle interior, the outer side of the interior trim (1) is the visible part thereof from inside the vehicle and the inner side of the interior trim (1) is the concealed side from inside the vehicle, which in the specific case shown in FIG. (1) where the interior trim (1) is a roof trim, is directly opposite the sheet metal of the vehicle roof.

Optionally, the invention considers a sandwich structure (2) comprising other layers placed between the core (4) and the decorating covering (3) or between the core (4) and the electrical conductive sheet (5).

The electrical conductive sheet (5) can extend along the entire surface of the interior trim (1) or partially along the surface of the interior trim (1) such that the dimensions thereof conform to the path of the electrical conductors (6).

Said electrical conductive sheet (5) in turn comprises:

a flexible carrier (5.1) such as a film, a fabric or a non-woven fabric, a first electrical conductive layers (5.2) screen printed on the flexible carrier (5.1) establishing the electrical conductors (6), a protective layer (5.3) that can optionally be screen printed, placed on the electrical conductive layers (5.2). Said protective layer (5.3) is meant to protect the electrical conductors (6) from moisture, short-circuits that may occur due to accidental contact between the electrical conductors (6) of the interior trim (1) and the vehicle body, and also adds mechanical strength to said electrical conductors (6). Consequently, the protective layer (5.3) is impermeable to liquids, such as moisture, and it creates a physical barrier for the vehicle body and it provides strength and resistance against wear to the electrical conductors (6).

The first electrical conductive layer (5.2) comprises a first portion (5.2.1) on which the protective layer (5.3) is located and a second portion (5.2.2) where the protective layer (5.3) is absent, that is, where the material forming the protective layer is not applied in the manufacturing method for said electrical conductive sheet (5), such that connection areas (6.1) are established for connecting the electrical devices (8) to the electrical conductor (6) through the edge (1.1) of the interior trim (1).

The connection areas (6.1) are within the perimeter of the interior trim (1) defined by the edge (1.1), that is, the connection areas (6.1) do not protrude out of said edge (1.1).

Figure 4:
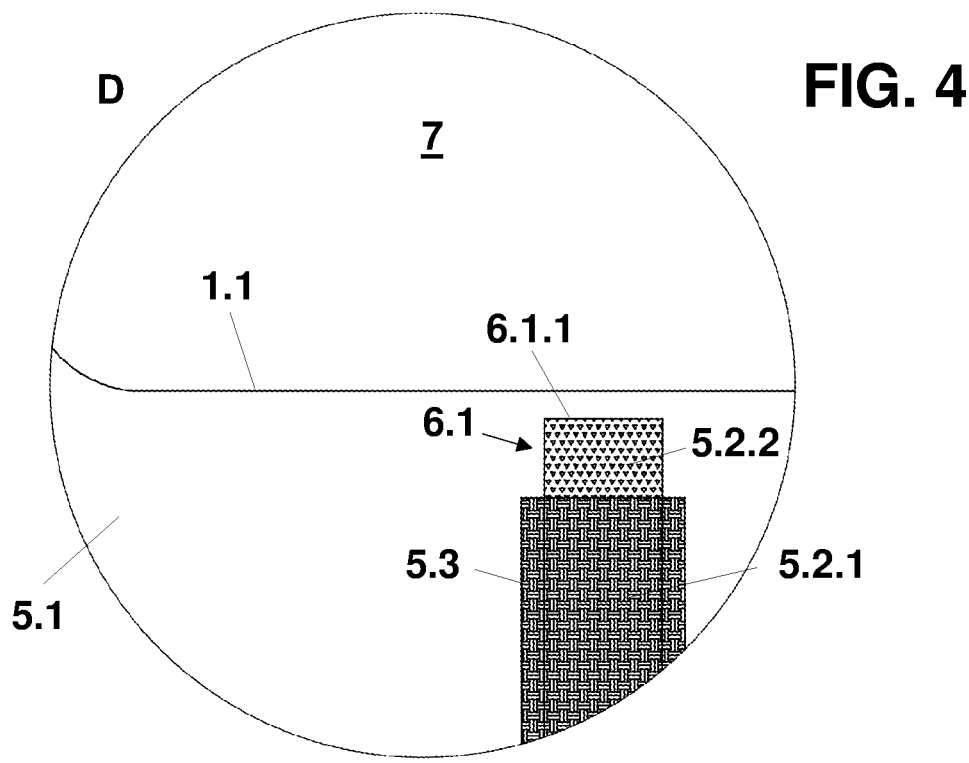
FIG. 4 shows a plan view of the detail D represented in FIG. 1, specifically showing the connection areas in an edge of the interior trim corresponding to an opening of the interior trim.
Figure 5:
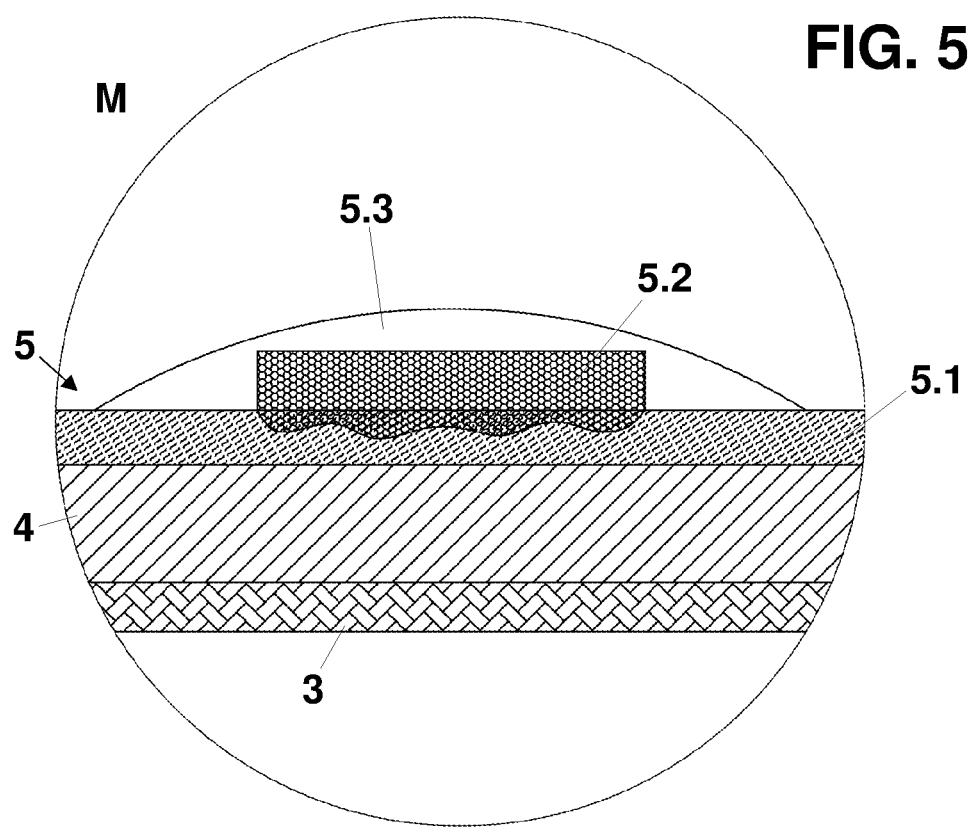
FIG. 5 shows a view of the detail M represented in FIG. 2, specifically showing the area of the conductive layer embedded in the fibrous flexible carrier.

Thus, the connection areas (6.1) can be flush with the edge (1.1) of the interior trim (1), or separated from said edge (1.1) as shown in the detail represented in FIG. 4.

Optionally, the electrical conductors (6) can form areas where there is a superposition (9) of electrical conductive layers in their path on the conductive sheet (5), as can be seen in FIG. 1.

Figure 6:
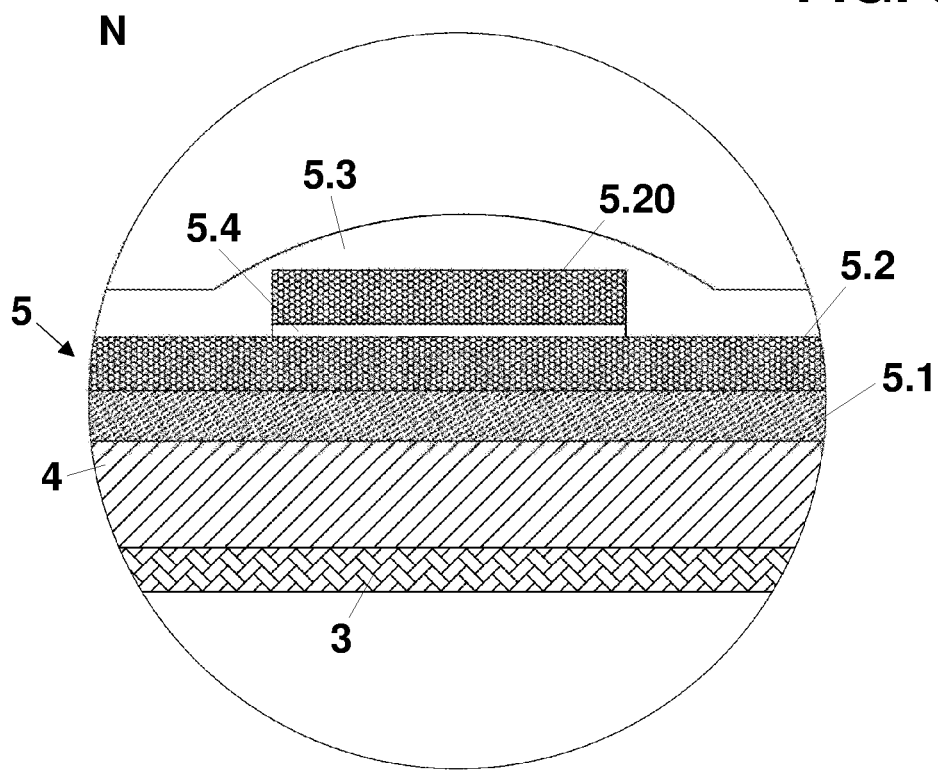
FIG. 6 shows a view of the detail N represented in FIG. 3, specifically showing the various layers forming a superposition of electrical conductive layers according to a first embodiment of the invention.

Said superpositions (9) of electrical conductive layers, according to a specific embodiment shown in FIG. 6, comprise a dielectric layer (5.4) on the first electrical conductive layer (5.2) and a second electrical conductive layer (5.20) on the dielectric layer (5.4). Therefore, in this specific case the protective layer (5.3) is placed on the second electrical conductive layer (5.20) such that it covers both the first electrical conductive layer (5.2) and the second electrical conductive layer (5.20).

Specifically, the dielectric layer (5.4) comprises an electrical insulating material that can create an insulation with an electrical resistance greater than 1 megaohm between the first electrical conductive layer (5.2) and the second electrical conductive layer (5.20).

Figure 7:
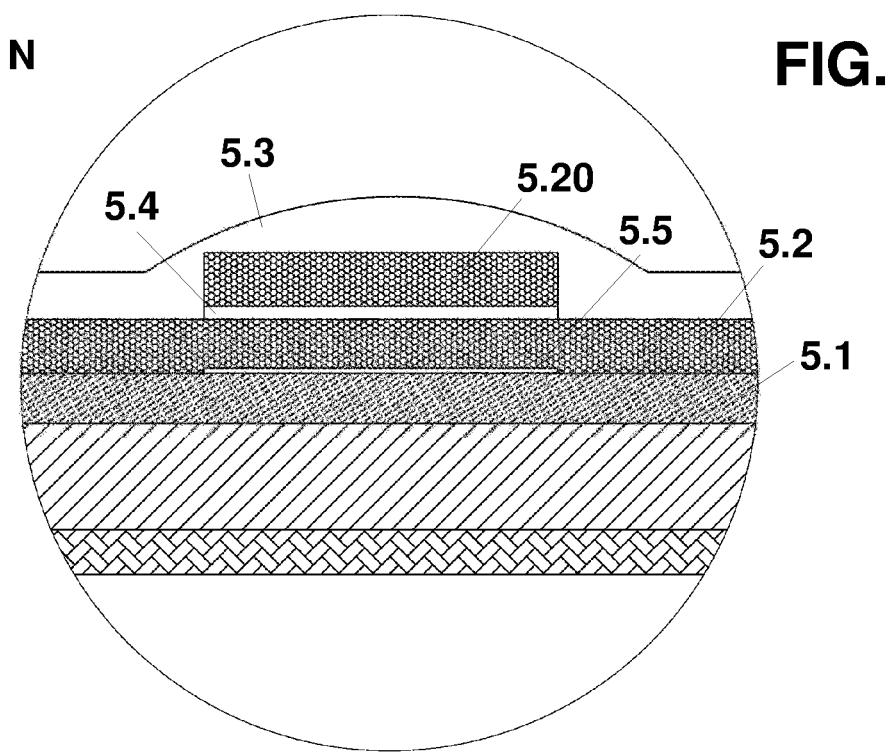
FIG. 7 shows a view of the detail N represented in FIG. 3, specifically showing the various layers forming a superposition of electrical conductive layers according to a second embodiment of the invention.

According to another specific embodiment shown in FIG. 7, the superpositions (9) of electrical conductive layers can also comprise a conditioning layer (5.5) between the flexible support (5.1) and the first electrical conductive layer (5.2) in order to cover completely the fibrous flexible carrier and thereby prevent potential fibre projections outside thereof that can result in a poor insulation which may lead to a short-circuit with the second electrical conductive layer (5.20).

This drawback is particularly present when the flexible support (5.1), as described below, is a fibrous support where part of the fibres that form it can be project out of same, reaching past the thickness of both the first electrical conductive layer (5.2) and that of the dielectric layer (5.4).

On the their hand, according to an embodiment not shown in the figures, the conditioning layer (5.5) can be applied between the flexible support (5.1) and the first electrical conductive layer (5.2) along the entire length of the electrical conductors (6).

This configuration can be advantageous when there is a fibrous flexible support (5.1) and it is intended to control the thickness of the first electrical conductive layer (5.2).

The dielectric layer (5.4), the second electrical conductive layer (5.20) and the conditioning layer (5.5) will all be applied by screen printing. This allows optimising the manufacturing installation of the interior trim (1) and the method cycle times.

The electrical conductive layers (5.2, 5.20) comprise conductive inks formed by a dispersion of particles comprising a conductive metal, dispersed in a solvent. Said conductive metal can for example be silver, copper, a combination thereof, etc.

Said conductive inks are specifically formulated to favour their compatibility with the various possible types of flexible supports (5.1) that form part of the electrical conductive sheet (5).

The protective layer (5.3) comprises insulating inks formed by scattered resin particles, of natural or synthetic origin, in a solvent, such that once deposited they form a layer on the electrical conductive layer (5.2, 5.20) that is impermeable to the moisture generated in the vehicle. Said resins can comprise, for example, silicone, polyester, acrylic resins etc.

The dielectric layer (5.4) comprises insulating inks formed by scattered resin particles, of natural or synthetic origin, in a solvent, such that once deposited they form a layer that electrical insulates the electrical conductive layer (5.2, 5.20); specifically, said continuous layer presents an insulation with an electrical resistance greater than 1 megaohm between the first electrical conductive layer (5.2) and the second electrical conductive layer (5.20).

Said resins can comprise, for example, silicone, polyester, acrylic resins, fluorinated polymers, etc.

Finally, the conditioning layer (5.5) comprises conditioning inks formed by scattered resin particles, of natural or synthetic origin, such that once deposited they create a layer that can condition the surface of the flexible carrier (5.1) forming a barrier between the flexible carrier and the first electrical conductive layer (5.2) meant to fully cover the fibrous flexible carrier and thereby prevent potential projections of fibres out of same. Some examples of these resins are silicone, acrylic resin, polyurethane, etc.

Optionally, according to an improved configuration of the interior trim (1) of the invention, the first screen-printed electrical conductive layer (5.2) and the second electrical conductive layer (5.20) can be heat treated to a temperature above 100° C. to trigger the cohesion of the metal material of the particles that form the conductive ink, resulting in a continuous conductive layer.

This heat treatment causes on the one hand the drying of the conductive ink by evaporating the solvent forming said conductive ink, leaving the deposit of particles on the flexible carrier (5.1), and also causing the cohesion of said particles resulting in a continuous conductive layer of metal material.

Said heat treatment can also be performed in a controlled atmosphere.

According to another improvement of the invention, the protective layer (5.3) can be heat treated at a temperature above 100° C. or treated with ultraviolet radiation to form a continuous impermeable layer.

This heat treatment causes on the one hand the drying of the ink by evaporating the solvent, and also causes the cohesion of the resin particles resulting in a continuous impermeable layer.

Optionally, these treatments of the protective layer (5.3) can cause the polymerisation of the resin particles, causing the formation of the polymer chains that form the resin.

Optionally and according to another improvement of the invention, the flexible support (5.1) is fibrous, allowing the first electrical conductive layers (5.2) to be embedded in said flexible carrier (5.1) and thereby improving the attachment of same to said flexible carrier (5.1).

Said flexible fibrous carrier (5.1) can be a fabric, a non-woven fabric or a paper.

The fibres that form the flexible carrier can be natural, mineral or synthetic fibres.

Natural fibres may be advantageous when the temperatures of the heat treatment to which the first electrical conductive layer (5.2) is optionally subjected are especially high.

The manufacturing method for the interior trim (1) for vehicles with electrical conductors (6) of the invention described above comprises the following stages:

arranging a core (4) comprising a first side (4.1) and a second side (4.2), arranging an electrical conductive sheet (5) on a second side of the core (4), arranging a decorative covering layer (3) on a first side of the core (4), where the decorative covering layer (3), the core (4) and the electrical conductive sheet (5) form a sandwich structure (2), shaping the sandwich structure (2) according to the shape of the interior trim (1), cutting the sandwich structure (2) along its outer perimeter and/or along its surface to form an opening (7) defining an edge (1.1) in the interior trim (1) to connect an electrical device (8) with the electrical conductor (6) through said edge (1.1).

Specifically, the manufacturing method for the electrical conductive layer (5) comprises the following stages:

arranging a flexible support (5.1) on the second side (4.2) of the core (4), arranging a first electrical conductive layer (5.2) screen printed on the flexible carrier (5.1) establishing the electrical conductors (6). The path of the electrical conductive layer (5.2) follows a predefined and specific route that depends on the power supply needs of each interior trim (1). Said needs are in turn constrained by the number and position of the electrical devices (8) that can be connected to the interior trim (1), arranging a protective layer (5.3) on the first electrical conductive layer (5.2).

The flexible carrier (5.1), the first electrical conductive layer (5.2) and the protective layer (5.3) form the electrical conductive sheet (5).

Specifically, the arrangement of the protective layer (5.3) is preferably performed by screen printing, on a first portion (5.2.1) of the first electrical conductive layer (5.2) such that in a second portion (5.2.2) of the first electrical conductive layer (5.2) the protective sheet (5.3) is absent in order to define connection areas (6.1) for connecting the electrical device (8) to the electrical conductor (6) and in that said connection areas (6.1) are in the perimeter of the interior trim (1) defined by the edge (1.1), that is, the connection areas (6.1) do not protrude from said edge (1.1).

Optionally, if superposition areas (9) of electrical conductive layers (5.2, 5.20) are formed, the manufacturing method for the interior trim (1) also comprises the following stages:

placing a dielectric layer (5.4) by screen printing on the first electrical conductive layer (5.2), placing a second electrical conductive layer (5.20) on the dielectric layer (5.4) forming an area of superposition (9) of conductive layers (5.2, 5.20), such that the second electrical conductive layer (5.20) has the protective layer (5.3) above it.

Optionally, regardless of whether superposition areas (9) of conductive layers (5.2, 5.20) are formed or if the thickness of the first electrical conductive layer (5.2) is controlled and for example if the flexible carrier (5.1) is a fibrous carrier, the manufacturing method also comprises the arrangement of a conditioning layer (5.5) by screen printing on the flexible carrier (5.1) before placing the first electrical conductive layer (5.2).

Optionally, the manufacturing method also includes a heat treatment stage of the first electrical conductive layer (5.2) and/or the second electrical conductive layer (5.20) to a temperature above 100° C. to trigger the cohesion of the metal material of the particles that form the conductive ink, resulting in a continuous conductive layers.

This heat treatment is performed before applying the protective layer (5.3).

Optionally, the manufacturing method also comprises a heat treatment or ultra-violet radiation treatment of the protective layer (5.3) to form a continuous impermeable layer.

The invention claimed is:

1. An interior trim for vehicles with electrical conductors that comprises a shaped sandwich structure comprising the following superimposed layers:
    a decorating covering forming an outer side of the interior trim,
    a core comprising a first side, on which the decorative covering is placed, and a second side,
    an electrical conductive sheet placed on the second side of the core forming an inner side of the interior trim comprising:
    a flexible carrier,
    a first electrical conductive layer screen printed on the flexible carrier that defines the electrical conductors,
    an impermeable protective layer placed on the first electrical conductive layers,
    wherein the interior trim comprises an edge defined in an outer perimeter of the interior trim and/or in a perimeter of an opening placed in said interior trim, for connecting an electrical device to the electrical conductor through said edge,
    wherein:
        the first electrical conductive layer comprises a first portion on which the protective layer is placed and a second portion in which the protective layer is absent wherein connection areas are established for connecting the electrical device,
        wherein the connection areas are inside the perimeter of the interior trim defined by the edge.

2. The interior trim for vehicles with electrical conductors according to claim 1, wherein the protective layer is a screen printed layer.

3. The interior trim for vehicles with electrical conductors according to claim 1, wherein the flexible carrier is fibrous.

4. The interior trim for vehicles with electrical conductors according to claim 3, wherein the screen-printed first electrical conductive layer is embedded in the flexible support.

5. The interior trim for vehicles with electrical conductors according to claim 1, further comprising a dielectric layer screen printed on the first conductive layer and a second conductive layer screen printed on the dielectric layer forming a superposition of conductive layers, such that the second screen-printed conductive layer has the protective layer on it,
    and wherein the dielectric layer comprises an electrical insulating material that can create an insulation with an electrical resistance greater than 1 megohm between the first electrical conductive layer and the second electrical conductive layer.

6. The interior trim for vehicles with electrical conductors according to claim 3, wherein there is also a conditioning layer screen printed between the flexible carrier and the first conductive layers that fully covers the fibrous flexible carrier to prevent potential fibre projections to the outside of the flexible carrier.

7. The interior trim for vehicles with electrical conductors according to claim 5, wherein further comprising a conditioning layer screen printed between the flexible carrier and the first conductive layers that fully covers the fibrous flexible carrier to prevent potential fibre projections to the outside of the flexible carrier.

8. The interior trim for vehicles with electrical conductors according to claim 1, wherein the first electrical conductive layer comprises a continuous conductive layer heat treated to a temperature above 100° C.

9. The interior trim for vehicles with electrical conductors according to claim 5, wherein the second electrical conductive layer comprises a continuous conductive layer heat treated to a temperature above 100° C.

10. The interior trim for vehicles with electrical conductors according to claim 1, wherein the protective layer comprises a continuous impermeable layer heat treated to a temperature above 100° C. or treated with ultra-violet radiation.

11. The interior trim for vehicles with electrical conductors according to claim 1, wherein the connection areas are separated from the edge of the interior trim corresponding to the electrical device that can be connected to said connection areas.

12. A method for manufacturing an interior trim for vehicles with electrical conductors according to claim 1 where the method for manufacturing the interior trim comprises the following stages:
    arranging a core comprising a first side and a second side,
    arranging an electrical conductive sheet on a first side of the core,
    arranging a decorative covering layer on a second side of the core,
    wherein the decorative covering layer, the core and the electrical conductive sheet form a sandwich structure,
    shaping the sandwich structure according to the shape of the interior trim,
    cutting the sandwich structure along its outer perimeter and/or along its surface to form an opening defining an edge in the interior trim to connect an electric device with the electrical conductor through said edge,
    wherein the manufacturing method for the electrical conductive sheet comprises the following stages:
    arranging a flexible carrier on the second side of the core,
    arranging a first electrical conductive layer by screen printing on the flexible support to establish the electrical conductors,
    arranging a protective layer on the first electrical conductive layer,
    where the flexible carrier, the first electrical conductive layer and the protective layer form the electrical conductive sheet,
    wherein:
    the arrangement of the protective layer is performed on a first portion of the first electrical conductive layer such that in a second portion of the first electrical conductive layer the protective sheet is absent in order to define connection areas for connecting the electrical device to the electrical conductor and in that said connection areas are in the perimeter of the interior trim defined by the edge.

13. The method for manufacturing an interior trim for vehicles with electrical conductors according to claim 12, wherein the arrangement of the protective layer is performed by screen printing.

14. The method for manufacturing an interior trim for vehicles with electrical conductors according to claim 12, further comprising:
    placing a dielectric layer by screen printing on the first electrical conductive layer,
    placing a second electrical conductive layer by screen printing on the dielectric layer forming a superposition of conductive layers, such that the protective layer is arranged on the second electrical conductive layer,
    wherein the dielectric layer comprises an electrical insulating material that can create an insulation with an electrical resistance greater than 1 megohm between the first electrical conductive layer and the second electrical conductive layer.

15. The method for manufacturing an interior trim for vehicles with electrical conductors according to claim 12, further comprising:
    arranging a dielectric layer by screen printing on the flexible carrier before arranging the first electrical conductive layer.

16. The method for manufacturing an interior trim for vehicles with electrical conductors according to claim 14, further comprising:
    arranging a dielectric layer by screen printing on the flexible carrier before arranging the first electrical conductive layer.

17. The method for manufacturing an interior trim for vehicles with electrical conductors according to claim 12, wherein the first electrical conductive layer is heat treated to a temperature above 100° C. to form a continuous conductive layer.

18. The method for manufacturing an interior trim for vehicles with electrical conductors according to claim 14, wherein the second electrical conductive layer is heat treated to a temperature above 100° C. to form a continuous conductive layer.

19. The method for manufacturing an interior trim for vehicles with electrical conductors according to claim 17, wherein said heat treatment is performed before applying the protective layer.

20. The method for manufacturing an interior trim for vehicles with electrical conductors according to claim 18, wherein said heat treatment is performed before applying the protective layer.

21. The method for manufacturing an interior trim for vehicles with electrical conductors according to claim 12, wherein the protective layer is heat treated to a temperature above 100° C. or treated with ultra-violet radiation to form a continuous impermeable layer.

* * * * *